US012128684B2

(12) United States Patent
Anderson et al.

(10) Patent No.: US 12,128,684 B2
(45) Date of Patent: Oct. 29, 2024

(54) FLUID CHANNELS OF DIFFERENT TYPES

(71) Applicant: Hewlett-Packard Development Company, L.P., Spring, TX (US)

(72) Inventors: Daryl Eugene Anderson, Corvallis, OR (US); James R. Przybyla, Corvallis, OR (US); Eric T. Martin, Corvallis, OR (US); Garrett E. Clark, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 66 days.

(21) Appl. No.: 17/921,333

(22) PCT Filed: May 22, 2020

(86) PCT No.: PCT/US2020/034210
§ 371 (c)(1),
(2) Date: Oct. 25, 2022

(87) PCT Pub. No.: WO2021/236099
PCT Pub. Date: Nov. 25, 2021

(65) Prior Publication Data
US 2023/0347646 A1 Nov. 2, 2023

(51) Int. Cl.
*B41J 2/14* (2006.01)
*B41J 2/175* (2006.01)
*B41J 2/18* (2006.01)

(52) U.S. Cl.
CPC ......... *B41J 2/1404* (2013.01); *B41J 2/14145* (2013.01); *B41J 2/175* (2013.01); *B41J 2/18* (2013.01); *B41J 2002/14459* (2013.01); *B41J 2202/12* (2013.01)

(58) Field of Classification Search
CPC ............. B41J 2/18; B41J 2/175; B41J 2/2114
See application file for complete search history.

(56) References Cited

U.S. PATENT DOCUMENTS 5,055,857 A * 10/1991 Regnault .................. B41J 2/175 347/89
7,413,300 B2 8/2008 Von Essen et al.
8,210,654 B2 7/2012 Wei et al.
8,439,487 B2 5/2013 Clarke et al.
10,214,023 B1 2/2019 Stephens
10,471,711 B2 11/2019 Karita et al.
2018/0290458 A1 10/2018 Govyadinov et al.
2020/0061992 A1* 2/2020 Chen ...................... B41J 2/1404
2020/0114655 A1 4/2020 Escudero Gonzalez et al.

FOREIGN PATENT DOCUMENTS

JP 2006-327048 A 12/2006

* cited by examiner

*Primary Examiner* — Scott A Richmond
(74) *Attorney, Agent, or Firm* — Foley & Lardner LLP

(57) ABSTRACT

An example fluid ejection device comprises a plurality of distinct fluid channels. Each fluid channel comprises a distinct fluid inlet to the ejection device. A subset of the plurality of distinct fluid channels comprises fluid recirculating fluid channels, and the remaining fluid channels comprising non-recirculating fluid channels.

12 Claims, 7 Drawing Sheets

FLUID CHANNELS OF DIFFERENT TYPES

BACKGROUND

Fluid ejection devices eject controlled quantities of fluids, such as in the form of droplets. In the context of fluid ejection devices for printing applications, printing fluids are ejected from ejection chambers by an actuator. In the context of biomedical applications, fluids such as biological samples, agents, and reagents may be ejected in controlled quantities (e.g., in the form in droplets) for tests and assays. Such biomedical applications may also use ejection chambers and actuators.

Different fluids may have different fluid characteristics, including solid concentration percentage, viscosity, volatility, etc.

BRIEF DESCRIPTION OF THE DRAWINGS

Various examples will be described below by referring to the following figures.

Figure 1:
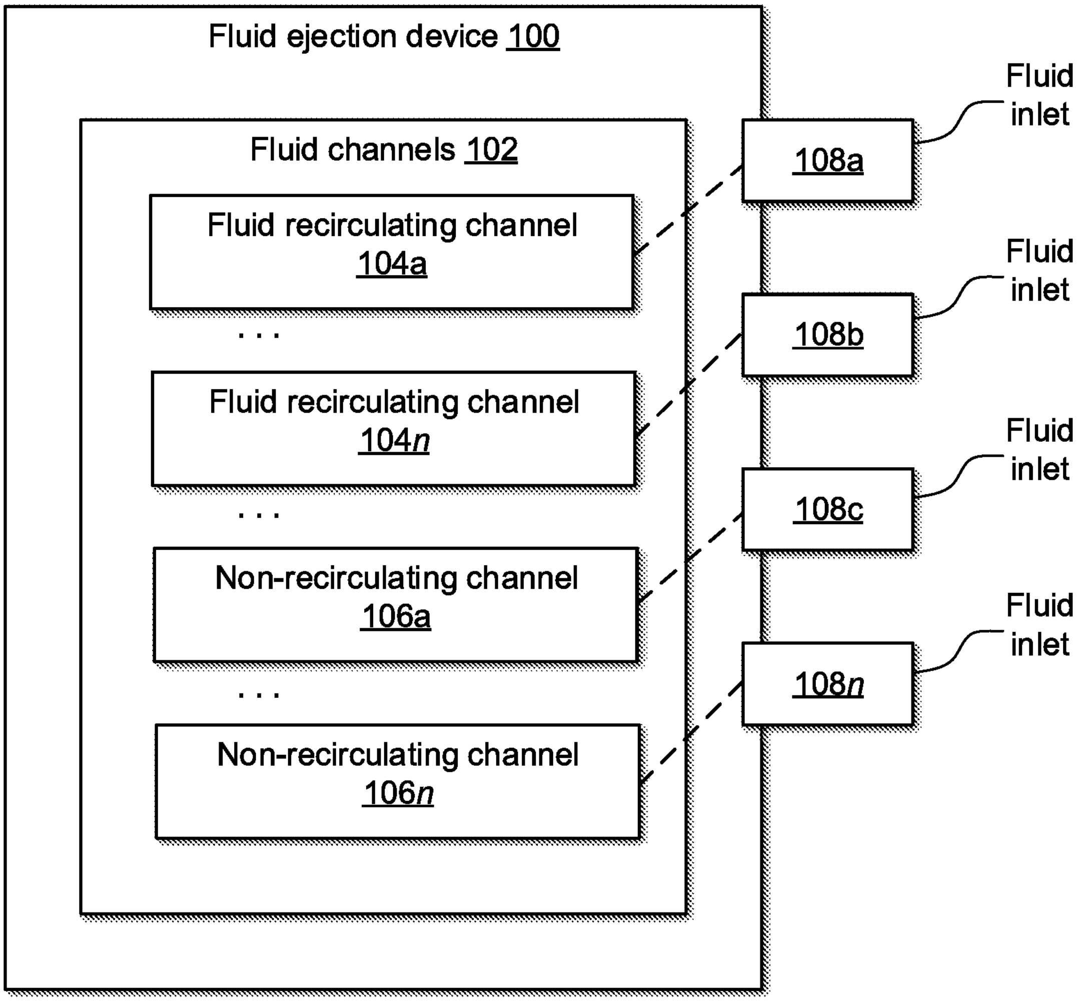
FIG. 1 is a block diagram illustrating an example fluid ejection device.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

In the context of fluid ejection devices, such as printing devices, there is a desire for high quality output. at times, there is a relationship between the quality of printed output and the fluid used by the fluid ejection devices. For instance, in some cases, higher quality printed output may be achieved by using fluids with elevated solid concentrations (e.g., the ratio of colorants, pigments, etc. to the fluid component is elevated). Additionally, fluids with fluid components that vaporize more quickly (referred to as the volatility of the fluid) may also yield higher quality output. At times, for instance, the fluid component may be absorbed by fibers of the print media and may cause swelling of the fibers, may cause the bonds to break down, may cause a portion of the colorants to flow away from the point of deposition, etc. Of course, in the context of other forms of printing, such as three-dimensional (3D) printing, fluids may be absorbed by a bed of build material.

In the context of fluid jetting, such as for inkjet printing, using such printing fluids with high solid content and/or volatile fluid components may introduce challenges. For instance, while the fluid is not in motion, the solid components of the fluid may tend to settle. As a result, solid-based clogs may form in fluid delivery lines. The solids may also cause the orifices of ejection chambers to become clogged as solids settle in the ejection chamber. Additionally, fluid components may vaporize and escape via the orifices at relatively high rates of speed, further accelerating a rate at which crusting may form at the orifice and in the chamber. Fluid motion may also be used to remove waste heat generated by the fluid ejection device.

One approach to overcoming solid separation and crust formation issues may be to keep the fluid in motion within the fluid delivery system. Recirculation of printing fluid is one way to keep solids suspended and minimize the effects of fluid evaporation. As used herein, recirculation refers to causing printing fluids to flow alternatively towards and away from fluid ejection chambers of a fluid ejection device. Thus, one form of recirculation is to push fluid into an ejection chamber, and then cause unejected fluid to flow back out of the ejection chamber. Another form of recirculation may include causing printing fluid to flow in a closed (or selectively closed) loop system and from which fluid may be extracted for ejection by ejection chambers. Fluid recirculation may thus be referred to in terms of different types. At a high level, two fluid recirculation types include a recirculating type fluid channel and a non-recirculation type fluid channel. Additionally, within the recirculating type channel, there are a number of distinct forms of recirculation which shall be discussed in greater detail hereinafter.

Recirculation may present other challenges, such as the added cost or complexity of pressurizing fluid lines of the closed loop system (e.g., pumps, vacuums, pressure regulators, valves, etc.). Furthermore, fluid ejection devices that use recirculation will often have multiple fluid channels (e.g., a fluid channel for black printing fluid, a fluid channel for cyan printing fluid, etc.). And the device will use recirculation on each fluid channel, thus potentially resulting in a multiplication of cost and complexity based on a number of fluid channels in the system.

There may be a desire, therefore, for an approach that may permit the use of fluids with high solid contents and/or volatile fluid components without the complexity and/or cost of a system that uses recirculation on each fluid channel.

Rather than enabling recirculation for each fluid channel, the present disclosure proposes using a combination of fluid channels of different types of recirculation. For instance, a set of recirculating type fluid channels combined with a set of non-recirculating type fluid channels. For example, in one case, a combination of challenging printing fluids may be used in conjunction with more traditional printing fluids in a same fluid ejection device. In this example, then, the challenging printing fluids (e.g., fluids with high solid content, fluids with volatile fluid components, etc.) may propagate through recirculation type fluid channels. Within the non-recirculating type fluid channels, the traditional printing fluids (e.g., traditional black, cyan, magenta, and/or yellow printing fluids) may be transported normally towards ejection chambers without recirculation. Typical capping and servicing routines may be satisfactory for maintaining solid suspension and mitigating orifice clogs for these example printing fluids.

Using a combination of recirculating types of fluid channels, such as non-recirculating and recirculating fluid channels, it may be possible to reduce the complexity and/or cost of a printing system, such as by reducing the number of support components for recirculation (e.g., pumps, pressure regulators, valves, etc.), while still enabling the use of more challenging fluids on a subset of fluid channels.

FIG. 1 illustrates an example fluid ejection device 100 comprising fluid channels 102. Fluid ejection device 100 refers to a device capable of ejecting fluid, such as in the form of droplets via orifices of the device. In one example, fluid ejection device 100 may comprise a printing module for jetting fluid (e.g., inkjet printing) comprising a fluidic die for ejecting fluid droplets. Fluid channels 102 refer to a path for a particular printing fluid. As such, fluid channels 102 may include a combination of tubes, conduits, and fluid paths spanning one or more components of fluid ejection device 100. As illustrated in FIG. 1, four independent fluid channels 102 are illustrated, a first fluid channel comprising a first fluid channel of a recirculating type, recirculating channel 104*a*, and a second fluid channel of a recirculating type, recirculating channel 104*n*, both of which represent two possible fluid channels of fluid channels 102. As shall be discussed in greater detail hereinafter with reference to FIG. 2, each of recirculating channel 104*a* and recirculating channel 104*n* may be different types of recirculating channels (e.g., based on particular characteristics of fluids propagating through the respective channels), or may be of a same recirculating type. In addition to the fluid recirculating channels, FIG. 1 illustrates two channels of a non-recirculating type: a first non-recirculating channel 106*a* and a second non-recirculating channel 106*n*. The presence of the ellipses between elements in the drawings (e.g., between the blocks for fluid recirculating channel 104*a* and fluid recirculating channel 104*n*) and the letters (a, b, c, and n at the end of element numbers) are to represent an unbounded set of fluid channels 102 of the different types. Thus, for example, in one example, fluid ejection device 100 may have but a single fluid recirculating channel 104*a*, while having one, two, or more non-recirculating channels 106*a*, 106*n*, etc. Likewise, in another implementation, fluid ejection device 100 may comprise but a single non-recirculating channel 106*a*, while having one, two, or more fluid recirculating channels 104*a*, 104*n*, etc.

In the context of a fluid device, such as fluid ejection device 100, each independent fluid channel of fluid channels 102 extends from a distinct entry and exit point (or a distinct starting and ending point). It is noted that the use of the term "distinct" is to distinguish an entry and exit point for a first fluid channel from an entry and exit point for a second fluid channel. For instance, each fluid channel of fluid channels 102 has an entry and an exit point that is distinct from the other fluid channels of fluid channels 102. Thus, each fluid channel of fluid channels 102 has a distinct fluid inlet (e.g., fluid inlet 108*a* corresponding to fluid recirculating channel 104*a*, fluid inlet 108*b* corresponding to fluid recirculating channel 104*n*, fluid inlet 108*c* corresponding to non-recirculating channel 106*a*, and fluid inlet 108*n* corresponding to non-recirculating channel 106*n*) and a distinct fluid outlet, in this case a distinct ejection chamber and orifice (not shown in FIG. 1, see, e.g., FIGS. 2 and 3A-3D). Though not shown in FIG. 1, fluid recirculating channels (e.g., 104*a* and/or 104*n*) of fluid channels 102 may also have distinct fluid outlets (see, e.g., FIG. 2).

A fluid channel may also be described in terms of distinct printing fluids in distinct fluid channels. In the implementation illustrated in FIG. 1, a first printing fluid (e.g., a printing fluid having a high solid content, such as a white printing fluid) may enter fluid ejection device 100 via a first fluid inlet 108*a*. The first printing fluid may traverse a first fluid recirculating channel 104*a* and may be ejected via ejection chambers and orifices of fluid ejection device 100 corresponding to the first printing fluid. Unejected printing fluid may continue to flow through fluid recirculating channel 104*a*. In one example, recirculating printing fluid may remain within fluid ejection device 100 or may exit fluid ejection device 100, such as via a fluid outlet, to return to a printing fluid reservoir for the first printing fluid.

A second printing fluid (e.g., a challenging printing fluid, such as a printing fluid comprising a clear topcoat for applying over a print job) may enter fluid ejection device 100 via a second fluid inlet 108*b*. The second printing fluid may traverse a second fluid recirculating channel 104*n* and may be ejected via ejection chambers and orifices of fluid ejection device 100 corresponding to the second printing fluid. Unejected printing fluid may continue to flow through fluid recirculating channel 104*n*. In one example, recirculating printing fluid may remain within fluid ejection device 100 or may exit fluid ejection device 100, such as via a fluid outlet, to return to a printing fluid reservoir for the second printing fluid.

A third printing fluid (e.g., a traditional printing fluid, including a typical black, cyan, magenta, or yellow printing fluid having fluid characteristics not necessitating recirculation) may enter fluid ejection device via a third fluid inlet 108*c*. The third printing fluid may traverse a first non-recirculating channel 106*a* and may be ejected via ejection chambers and orifices of fluid ejection device 100 corresponding to the third printing fluid. A fourth printing fluid (e.g., a traditional printing fluid, including a typical black, cyan, magenta, or yellow printing fluid having fluid characteristics not necessitating recirculation) may enter fluid ejection device via a fourth fluid inlet 108*n*. The fourth printing fluid may traverse a second non-recirculating channel 106*n* and may be ejected via ejection chambers and orifices of fluid ejection device 100 corresponding to the fourth printing fluid.

It should be appreciated, therefore, that a device, such as fluid ejection device 100, including a combination of fluid channels of different types (e.g., fluid recirculating channels and non-recirculating channels) may be of interest, such as to reduce cost and/or complexity of devices that may otherwise have only fluid recirculating channels while still being able to use challenging and/or volatile printing fluids.

As should be apparent from the foregoing, the present application proposes a fluid ejection device (e.g., fluid ejection device 100) comprising a plurality of distinct fluid channels (e.g., fluid channels 102, including a combination of fluid recirculating channel 104*a*, fluid recirculating channel 104*n*, non-recirculating channel 106*a*, or non-recirculating channel 106*n*), each fluid channel comprising a distinct fluid inlet (e.g., fluid inlets 108*a*, 108*b*, 108*c*, and/or 108*n*) to the ejection device. As noted, a subset of the plurality of distinct fluid channels comprise fluid recirculating channels (e.g., fluid recirculating channel 104*a* and/or fluid recirculating channel 104*n*). The remaining fluid channels in this example comprise non-recirculating channels (e.g., non-recirculating channel 106*a* and/or 106*n*).

Figure 2:
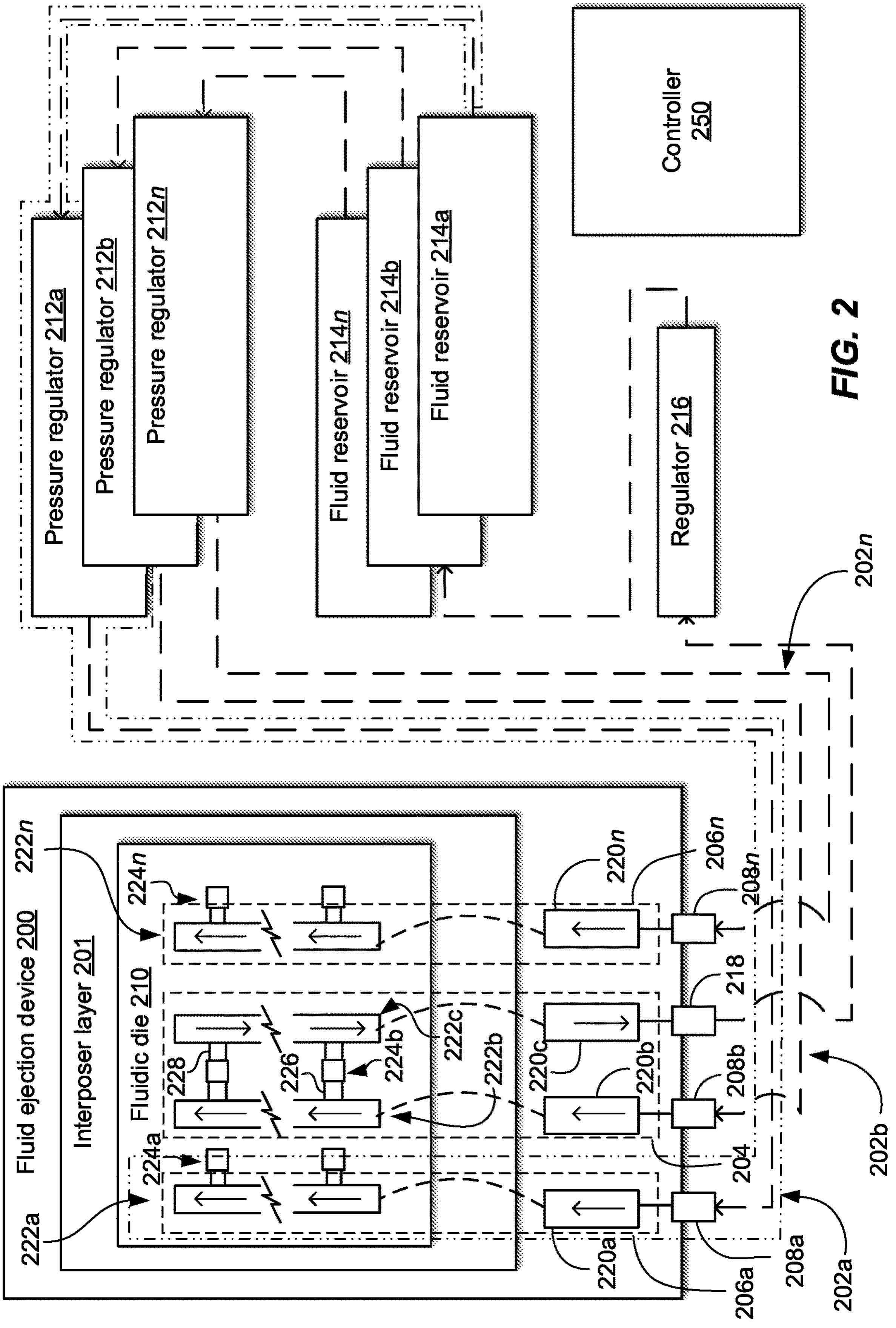
FIG. 2 is a block diagram illustrating an example system with an example fluid ejection device.

In some cases, fluid channels may include portions that extend beyond the entry and/or exit points of fluid ejection devices (e.g., fluid ejection device 100 of FIG. 1). Nevertheless, each distinct fluid channel still has a distinct starting and ending point as compared with other fluid channels of the system. With the foregoing in mind, FIG. 2 illustrates a fluid delivery and ejection system comprising a number of components, including a combination of fluid channels of different types, including recirculating and non-recirculating fluid channels. The illustration of FIG. 2 also provides context for different forms of recirculation, which the present disclosure proposes using in different combinations based on characteristics of desired printing fluids and the desire for reducing complexity and cost of fluid delivery and ejection systems.

FIG. 2 illustrates a fluid ejection device 200, which may be similar in structure and function to fluid ejection device 100, discussed above with reference to FIG. 1. It is noted that this disclosure uses like numbers to represent components with similar structure and function. Thus, for example, component 101 in FIG. 1 may be similar in structure and function to 201, etc. Nevertheless, limitations introduced discussing certain implementations are not intended to be read into other implementations unless explicitly stated. Fluid ejection device 200 includes a fluidic die 210. Fluidic die 210 refers to a combination of electronics and fluidics in a slab of semiconductor material, such as silicon. The electronic components of fluidic die 210 may include conductive materials to carry signals and actuators to cause fluids to propagate and/or eject.

Fluidic die 210 may include a number of fluid slots, 222*a*, 222*b*, 222*c*, and 222*n*. Fluid slots, such as fluid slot 222*a*, may act as fluid trunk lines of fluidic die 210 that carry comparatively larger volumes of fluids towards ejection chambers of fluidic die 210. That is, the volumes of fluids in fluid slot 222*a* are larger than the volumes of fluids propagating through ejection chambers. Thus, in some examples, an array of ejection chambers, as illustrated by 224*a*, 224*b*, and 224*n* may branch off of fluid slots 222*a*, 222*b*, 222*c*, and/or 222*n*, respectively. Capillary forces may draw fluid into ejection chambers of an array of ejection chambers (e.g., array of ejection chambers 224*a*), such as in response to operation of an actuator in the ejection chambers. In other examples, micropumps may be arranged in chamber inlets and/or outlets (e.g., chamber inlet 226, which is the only inlet numbered in FIG. 2 to avoid crowding in the drawing) and may facilitate transfer of fluid from the fluid trunk lines towards the ejection chambers.

Fluidic die 210 illustrates an implementation in which fluid slot 222*b* propagates fluid in a first direction (as illustrated by the arrows above the slots) while fluid slot 222*c* propagates fluid in a second direction (e.g., towards an output of fluidic die 210). Using such an approach, it may be possible to recirculate fluids through a fluidic die, such as fluidic die 210. Indeed, as illustrated, a chamber inlet 226 may be used to carry fluid towards an ejection chamber (e.g., ejection chamber 224*b*). Unejected fluid may be carried away from the ejection chamber via a chamber outlet (e.g., chamber outlet 228 is labeled, but a corresponding chamber outlet would be used to carry fluid away from ejection chamber 224*b*). After leaving the chamber outlet, fluid circulates away from the array of ejection chambers via fluid slot 222*c*.

The recirculation of fluids through ejection chambers, such as from one fluid slot or trunk towards another is referred to herein as microrecirculation. The volumes of fluid flowing through fluid paths branching off the slots will be comparatively smaller than those propagating through the slots, such as on the order of microliters compared with milliliters for a sampling period, by way of non-limiting example. In some cases, for instance, the difference in flow rate may vary by more or less over larger periods of time (e.g., macrorecirculation-type fluid circulation may run continuously or semi-continuously, while microrecirculation-type fluid circulation may only run for limited intervals of time, thus leading to 10*x*-100*x* less fluid being moved in a given time interval). There may be a desire to use microrecirculation because flow of fluid through an ejection chamber may reduce a tendency of fluids to coagulate or clot within the ejection chamber. Additionally, the fluid flowing through and/or in proximity to ejection chambers may act to carry thermal energy away from the ejection chambers. For instance, in the case of thermal inkjet actuators, heat generated by the actuators is used to cause fluids to be ejected and to propagate. But as heat builds up in fluidic die 210, the characteristics of fluid droplets may change. In some cases, particular ejection chambers may eject droplets more frequently than others. These ejection chambers may cause hot spots on fluidic die 210 that may yield undesirable ejection and/or droplet characteristics. Thus, there may be a desire to use printing fluid as a carrier to absorb thermal energy and displace it, such as to reduce hot spots on fluidic die 210 (of course, due to its larger flow volumes fluid, macrorecirculating-type circulation may be even more effective for thermal dissipation than microrecirculating-type fluid circulation). In these (and other) contexts, therefore, microrecirculation may be one type of recirculation that is of interest.

In some examples, there may be a structure between fluid ejection device 200 and fluidic die 210. This structure, referred to in FIG. 2 (and hereinafter) as interposer layer 201, may serve the function of providing physical support to fluidic die 210. Interposer layer 201 may also act as a fluidic fan-out structure to scale up and/or down fluid volumes as they propagate away from/towards fluidic die 210.

FIG. 2 illustrates a number of fluid channels, fluid channel 202*a*, fluid channel 202*b*, and fluid channel 202*n*. Each respective fluid channel spans from a fluid reservoir (e.g., fluid reservoir 214*a*, 214*b*, and 214*n*), which is a starting point for the channels, towards an end point (e.g., towards ejection chambers and, in the case of fluid channel 202*b*, a return towards fluid reservoir 214*b*). A dash-dot-dot outline is drawn around components of fluid channel 202*a* to show that fluid channel 202*a* does span from fluid reservoir 214*a* (starting point) towards an array of ejection chambers 224*a* (end point). In order to limit markings in FIG. 2, corresponding outlines are not used for fluid channels 202*b* and 202*n*. However, it is to be understood that respective fluid channels referred to by element numbers 202*b* and 202*n* also have respective starting and end points. As shall be discussed in greater detail hereinafter, a starting point for fluid channel 202*n* is fluid reservoir 214*n* and an end point is an array of ejection chambers 224*n*. For fluid channel 202*b*, a starting point is a fluid reservoir 214*b*, fluid may be ejected from array of ejection chambers 224*b* (a first end point) and back towards fluid reservoir 214*b* (an end point for unejected fluid). As discussed above in the context of FIG. 1, each fluid channel has an independent entry and/or exit point into fluid ejection device 200. For instance, fluid in fluid channel 202*a* enters fluid ejection device 200 via a fluid inlet 208*a*. The fluid traverses a fluid conduit 220*a* and continues on through interposer layer 201 and into fluid slot 222*a* of fluidic die 210. The fluid exits fluid ejection device 200 by ejection via the array of ejection chambers 224*a*. As such, fluid in fluid channel 202*a* does not mix with fluid in the other fluid channels (e.g., fluid channels 202*b* and 202*n*).

In contrast to fluid channel 202*a* (which is a non-recirculating type fluid channel), fluid channel 202*b* is a recirculating type fluid channel, as illustrated by the dashed box indicative of a fluid recirculating channel 204. Thus, fluid entering fluid ejection device 200 via fluid inlet 208*b* traverses a fluid conduit 220*b*, interposer layer 201, and fluid slot 222*b* travelling in a first direction. The fluid will be directed towards fluid slot 222*c* of fluid recirculating channel 204 (e.g., such as due to a pressure differential between fluid slot 222*b* and 222*c*), such as via chamber inlet 226, ejection chamber 224*b*, and chamber outlet 228. The fluid propagating through fluid slot 222*c* travels in a different direction than that propagating through fluid slot 222*b*, however, the orientation of fluid flow may differ depending on a particular implementation (as shall be discussed in further detail hereinafter with reference to FIGS. 3E and 3F). The fluid in fluid slot 222*c* will flow through interposer layer 201, fluid conduit 220*c*, and out of fluid ejection device 200 via fluid outlet 218.

In addition to the microrecirculating type recirculation channels, another type of recirculation channel is a macro-recirculating type recirculation channel. Macrorecirculating type recirculation refers to recirculation of fluids that does not traverse ejection channels. Though not illustrated in FIG. 2, there may be direct fluid connections (e.g., bypasses) between fluid conduits 220*b* and 220*c* and/or between fluid flow paths within interposer layer 201 to enable fluid in fluid channel 202*b* to flow back out of fluid ejection device 200 without traversing ejection chambers within fluidic die 210. For instance, there may be a desire to cause printing fluid to recirculate independent of any fluid propagation in fluidic die 210. Such recirculation of fluids involves larger volumes of fluids than those recirculating within fluidic die 210 and discussed above within the context of microrecirculation. Macrorecirculation may be of interest to maintain solid components of print fluids suspended and may also provide benefits for dissipating thermal energy (e.g., such as by causing fluid to flow in proximity to a back side of fluidic die 210). While both micro- and macrorecirculation may be performed in combination, at times, macrorecirculation may be performed independently of microrecirculation, and vice versa. The combination of macrorecirculation and microrecirculation is referred to herein as full system recirculation.

The use of different types of recirculation, such as macrorecirculation and microrecirculation, may be based on solid levels within a fluid. For instance, in some cases there may be a threshold solid level for which recirculation types may be of interest. In one example, a threshold solid level above which macro-and/or microrecirculation may be beneficial may include a solid concentration equal to or greater than 5%; in another example, a threshold solid level may include equal to or greater than 10% solid concentration level; etc. Additionally, the use of different types of recirculation may be based on fluid component volatility levels. In cases of printing fluids with volatile fluid components, microrecirculation may be of particular interest, such as to avoid nozzle clogs, by way of example. For instance, in some cases there may be a threshold volatility level for which recirculation types may be of interest, such as described in terms of vapor pressures or boiling points. Examples of volatility thresholds include aqueous fluid formulations with concentrations of 15-30% of high boiling point solvents, such as 1,2-butanediol (which has a boiling point of approximately 195° C.), without limitation. In other examples, lower concentrations of solvents (e.g., concentrations of less than 15%) and/or substitution of lower boiling point solvents, like ethyl lactate (which has a boiling point of approximately 150° C.), may indicate desirability of fluid recirculation. Of course, these are but two of a number of possible examples.

In addition to the components of fluid ejection device 200 discussed above, FIG. 2 also illustrates a number of other components that may be useful to enable recirculation. A number of fluid reservoirs, fluid reservoirs 214*a*, 214*b*, and 214*n*, are illustrated as part of fluid channels 202*a*, 202*b*, and 202*n*, respectively. Reservoirs 214*a*, 214*b*, and 214*n* refer to structures to hold printing fluids and are in fluid communication (e.g., a fluid connection between components and through which fluid may propagate) with fluid ejection device 200.

Pressure regulators 212*a*, 212*b*, and 212*n* refer to devices capable of maintaining desired pressure levels through different components of fluid channels 202*a*, 202*b*, and 202*n*. For example, by exerting a constant pressure on fluid in fluid channel 202*a* (e.g., such as in combination with pumps and vacuums, which are not shown), the fluid may be caused to flow towards ejection chambers (e.g., array of ejection chambers 224*a*). Such pressure may be of interest, such as to mitigate air ingested at ejection chambers. However, it is to be understood that in some implementations, pressure regulators, such as pressure regulator 212*a*, may be omitted.

Pressure regulator 212*b*, in fluid communication with a fluid inlet 208*b* may be paired with a regulator 216 (which may be similar in form and/or structure as pressure regulator 212*b*) in fluid communication with fluid outlet 218. In one implementation, a pressure applied at fluid inlet 208*b* may be greater than a pressure at fluid outlet 218. Consequently, fluid may be caused to flow through fluid conduit 220*b*, fluid slots 222*b* and 222*c*, and fluid conduit 220*c*, as illustrated by the arrows in these respective components. In some examples, different pressure levels may be applied to different fluid inlets (e.g., fluid inlet 208*a*, 208*b*, or 208*n*) by pressure regulators (e.g., pressure regulators 212*a*, 212*b*, and 212*n*), pumps, and/or vacuums. For instance, a greater pressure may be applied by pressure regulator 212*b* (e.g., in conjunction with pumps and/or vacuums) than is applied by pressure regulator 212*a*, in some cases.

In one example, regulator 216 may be in the form of a valve and may be closed while actuators in array of ejection chambers 224*b* are energized to cause ejection of fluid droplets. However, in other examples, pressure regulator 212*b* and regulator 216 may work in concert to enable recirculation of fluid within fluid channel 202*b* (e.g., between fluid inlet 208*b* and fluid outlet 218) while actuators in array of ejection chambers 224*b* are energized to cause ejection of fluid droplets.

Operation of components of the system illustrated in FIG. 2 may be enabled and caused to operate in response to reception of signals from a controller 250. Controller 250 refers to a processing mechanism comprising a combination of hardware and/or software (but not software per se) capable of receiving instructions, such as in the form of signals or states, and executing the received instructions to enable functionality of the controller and/or other parts of the device (e.g., fluid ejection device 200). Example controllers include field-programmable gate arrays (FPGAs), application-specific integrated circuits (ASICs), and general-purpose processing units, by way of non-limiting example. In response to execution of instructions, which may be stored in and fetched from a non-transitory memory device, signals may be transmitted by controller 250 to enable operation of elements of the system of FIG. 2. For instance, controller 250 may transmit signals to pressure regulators 212*a*, 212*b*, and 212*n* and regulator 216 (e.g., in conjunction with pumps and/or vacuums) to control pressurization levels across fluid channels 202*a*, 202*b*, and 202*n*. Additionally, controller 250 may transmit signals to ejection chambers of fluid ejection device 200 to cause ejection of fluid droplets. However, as such operation of fluid ejection is understood in the art, it is thus not further elaborated herein.

Consistent with the foregoing discussion, therefore, in one example, a fluid ejection device (e.g., fluid ejection device 200) may have fluid recirculating channels (e.g., fluid recirculating channel 204) are to circulate fluid at the macro level (macrorecirculation-type recirculation), at the micro level (microrecirculation-type recirculation), or at a combination thereof (full system type recirculation).

The fluid ejection device (e.g., fluid ejection device 200) may include a fluidic die (e.g., fluid ejection die 210) having a plurality of ejection chambers (e.g., arrays of fluid ejection chambers 224*a*, 224*b*, and 224*n*). A subset of the plurality of ejection chambers correspond to the fluid recirculating channels (e.g., array of fluid ejection chambers 224*b* of fluid recirculating channel 204). The fluid ejection device also includes fluid inlets (e.g., fluid inlet 208*a* being one example) leading to the fluid recirculating subset of the plurality of ejection chambers, and fluid outlets (e.g., fluid outlet 218 being one example) leading away from the fluid recirculating subset of the plurality of ejection chambers.

In another example, a fluid ejection device (e.g., fluid ejection device 200) includes a fluidic die (e.g., fluidic die 210), a plurality of fluid inlets (e.g., fluid inlets 208*a*, 208*b*, and 208*n*), and a plurality of distinct fluid channels (e.g., fluid channels 202*a*, 202*b*, and 202*n*), each fluid channel to provide fluid communication between the plurality of fluid inlets and the fluidic die (e.g., as illustrated by fluid conduits 220*a*, 220*b*, and 220*n* and arrows linking fluid inlets to ejection chamber arrays). A first fluid channel of the plurality of distinct fluid channels (e.g., fluid channel 202*a*) to receive a first printing fluid and a second fluid channel of the plurality of distinct fluid channels (e.g., fluid channel 202*b*) to receive a second printing fluid. The first fluid channel comprises a fluid channel of a first circulation type (e.g., in FIG. 2, this is a non-recirculating type fluid channel 206) and the second fluid channel comprising a fluid channel of a second circulation type (e.g., in FIG. 2, this is a fluid recirculating channel 204; additionally, as described, above, fluid recirculating channel 204 illustrates microrecirculation type fluid recirculation).

In cases in which the first printing fluid propagates through a recirculating type fluid channel (e.g., fluid channel 202*b*), the first printing fluid may comprise black printing fluid. And the circulation type corresponding to the recirculating type fluid channel may comprise macrorecirculation. Printing fluid of a second type may comprise one of cyan, magenta, or yellow and the circulation type corresponding to the printing fluid of the second type may comprise non-recirculation (e.g., fluid channel 202*n*). Besides black and colored (e.g., cyan, magenta, or yellow) printing fluids, other printing fluids may be used, including, but not limited to, "clear" printing fluids (e.g., comprising acrylic polyurethane, etc.) that may be applied over other printing fluids for protection, among other things (e.g., overcoats, undercoats, etc.). The term "clear" printing fluids is used to refer to fluids that, while potentially not completely clear, are used to form transparent coatings on a medium (e.g., they do not include colorants), by way of example. Table 1 illustrates other examples of fluid types and recirculation types contemplated by the present disclosure. These examples are presented to provide illustrative examples, and are not intended to be taken in a limiting sense.

TABLE 1

| Example Number | Black fluid | Color fluid | Clear fluid |
|---|---|---|---|
| 1 | Macrorecirculation | Microrecirculation | NA |
| 2 | Macrorecirculation | No recirculation | NA |
| 3 | Microrecirculation | No recirculation | NA |

TABLE 1-continued

| Example Number | Black fluid | Color fluid | Clear fluid |
|---|---|---|---|
| 4 | Micro- and macrorecirculation | Micro- and macrorecirculation | No recirculation |
| 5 | No recirculation | No recirculation | Macro- and microrecirculation |

In one example, the first printing fluid (e.g., such as the printing fluid discussed in the last paragraph) may comprise a first solid level above a threshold and the first circulation type may comprise microrecirculation, macrorecirculation, or a combination thereof.

In another example, the first printing fluid (e.g., such as the printing fluids discussed in the preceding two paragraphs) may comprise a clear printing fluid and the first circulation type comprises microrecirculation, macrorecirculation, or a combination thereof. The second printing fluid (e.g., such as the printing fluids discussed in the preceding two paragraphs) may comprise one of black, cyan, magenta, or yellow, and the second circulation type may comprise macrorecirculation or non-recirculation.

In one example, a fluid ejection system (e.g., the system illustrated in FIG. 2) may further comprise a pressure regulator (e.g., pressure regulator 212*a*) in fluid communication with a first fluid inlet (e.g., fluid inlet 208*a*) and arranged between the first fluid inlet and a first fluid reservoir (e.g., fluid reservoir 214*a*).

In one example, the fluid ejection system may be arranged such that a pressure at a first fluid inlet (e.g., fluid inlet 208*a*) is different from a pressure at a second fluid inlet (e.g., fluid inlet 208*b*).

In another example of the fluid ejection system, a fluid ejection device (e.g., fluid ejection device 200) comprises a fluid interposer layer (e.g., interposer layer 201) in contact with a fluidic die (e.g., fluidic die 210). The fluid interposer layer comprises fluid paths in fluid communication with a plurality of fluid inlets (e.g., fluid inlets 208*a*, 208*b*, and 208*n*), wherein a subset of the fluid paths are connected to fluid return passages (e.g., fluid path illustrated by the dashed line connecting fluid slot 222*c* to fluid conduit 220*c*) to direct print fluid away from a first set of fluid ejection chambers (e.g., array of ejection chambers 224*b*) and to a first fluid outlet (e.g., fluid outlet 218).

Figure 3A:
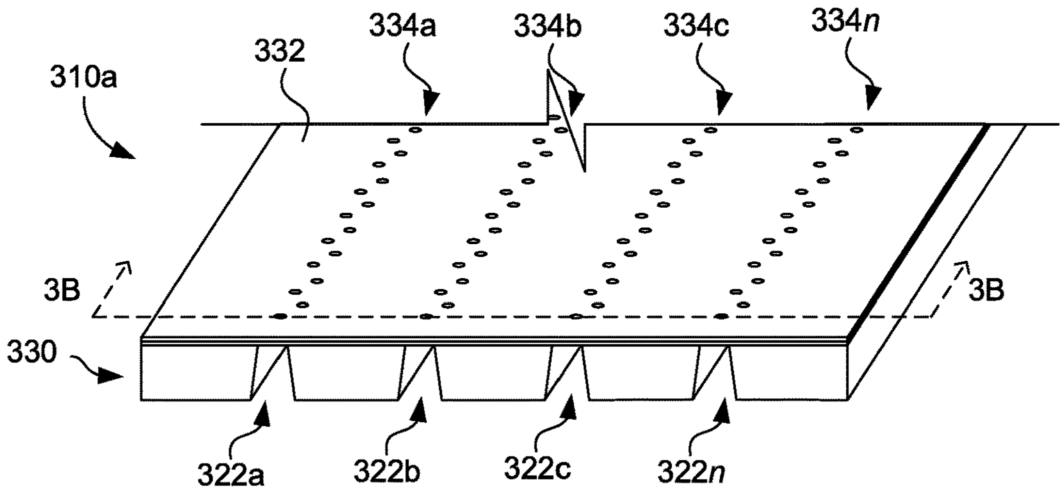
FIGS. 3A-3F illustrate example fluidic dies offering differing types of recirculating channels.
Figure 3B:
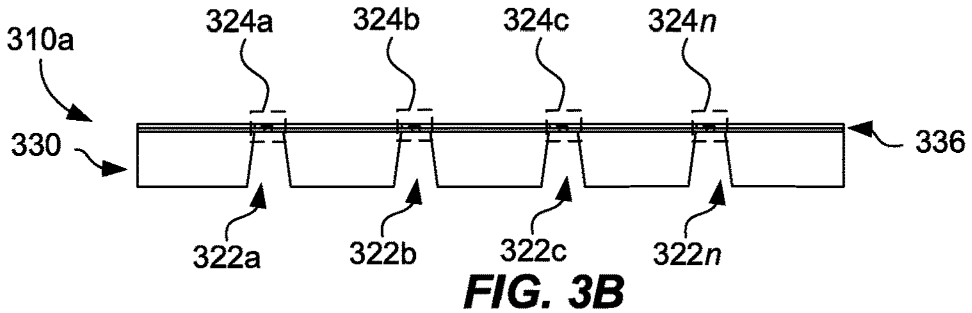

FIGS. 3A-3B illustrate an example fluidic die 310*a*. FIG. 3A is a view of fluidic die 310*a* that shows an orifice layer 332 in which arrays of orifices are shown (e.g., arrays of orifices 334*a*, 334*b*, 334*c*, and 334*n*) in an alternating offset orifice arrangement. Arrays of orifices 334*a*, 334*b*, 334*c*, and 334*n* are in fluid communication with fluid slots 322*a*, 322*b*, 322*c*, and 322*n*, respectively. Fluid slots 322*a*, 322*b*, 322*c*, and 322*n* are formed in a substrate 330, which is in the form of a silicon slab in some cases.

FIG. 3B is a cross-sectional view of fluidic die 310*a*, across line 3B illustrated in FIG. 3A. FIG. 3B shows ejection chambers 324*a*, 324*b*, 324*c*, and 324*n* and a fluidic layer 336, such as through which chamber inlets and outlets may be arranged. Fluid layer 336 may comprise a layer (or multiple layers) of polymer material, such as a photo imageable polymer layer, like SU-8. As part of a photolithographic process, fluid layers may be formed to define fluid paths, ejection chambers, and orifices. As discussed above in relation to FIG. 2, fluid may enter fluid slots 322*a*, 322*b*, 322*c*, and 322*n* and be ejected via orifices (e.g., arrays of orifices 334*a*, 334*b*, 334*c*, and 334*n*) of ejection chambers 324*a*, 324*b*, 324*c*, and 324*n*.

In one implementation, each of fluid slots 322*a*, 322*b*, 322*c*, and 322*n* corresponds to a non-recirculating channel, such as non-recirculating channels 206*a* and 206*n*, which were discussed above in relation to FIG. 2. In some examples, one or more of fluid slots 322*a*, 322*b*, 322*c*, and 322*n* may correspond to a fluid recirculating channel, such as fluid recirculating channel 204, discussed above in relation to FIG. 2 (e.g., a fluid recirculating channel of a macrorecirculating type).

Figure 3C:
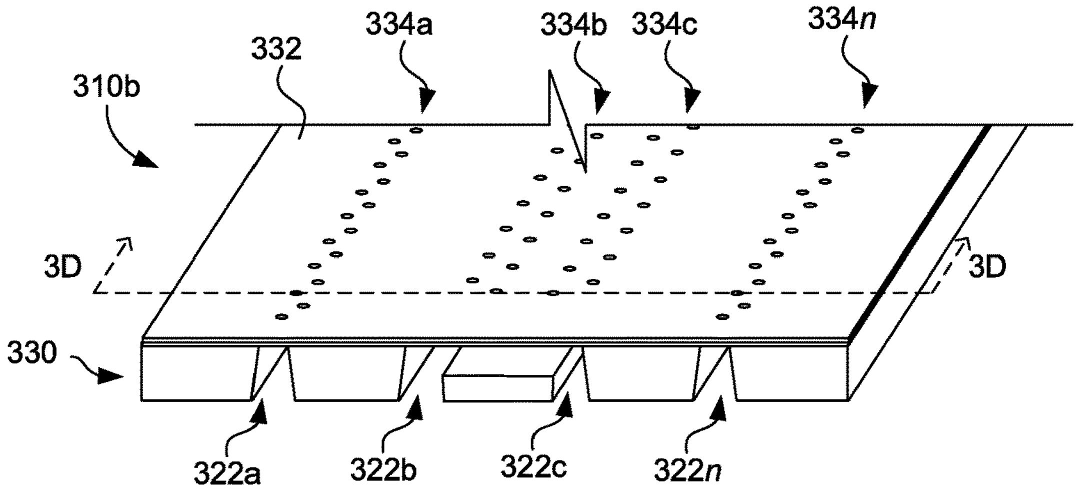
Figure 3D:
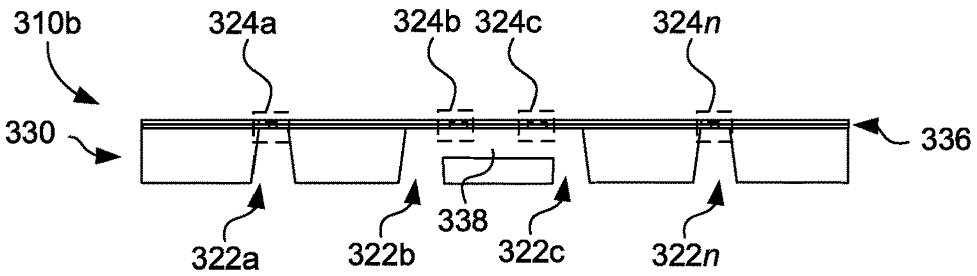

FIGS. 3C and 3D illustrate another example fluidic die 310*b*, which includes a combination of recirculating channel types: non-recirculating channels and fluid recirculating channels (e.g., of microrecirculating type, macrorecirculating type, or a combination thereof). In this example, fluid slot 322*a* corresponds to fluid slot 222*a* in FIG. 2; fluid slots 322*b* and 322*c* correspond to fluid slots 222*b* and 222*c* in FIG. 2; and fluid slot 322*n* corresponds to fluid slot 222*n* in FIG. 2. In this example, orifice layer 332 includes arrays of orifices 334*a*, 334*b*, 334*c*, and 334*n*, which correspond to fluid channels of a fluid recirculation type, such as non-recirculation, microrecirculation, macrorecirculation, or full system recirculation. For instance, arrays of orifices 334*b* and 334*c* may correspond to a fluid having a solid content concentration that exceeds a threshold, a fluid volatility level that exceeds a threshold, and/or a fluid type that otherwise may benefit by a form of recirculation, such as microrecirculation and/or macrorecirculation, by way of example.

In the example illustrated in FIG. 3D, it is noted that a backside channel 338 is formed in substrate 330, such as to allow fluid to flow behind fluidic layers 336. Ejection chambers, such as ejection chambers 324*b* and 324*c* may be fluidically connected to backside channel 338 through a chamber inlet (e.g., chamber inlet 226 in FIG. 2) and a chamber outlet (e.g., chamber outlet 228 in FIG. 2). In the examples of types of fluid recirculation discussed above, fluid may be caused to circulate through backside channel 338 independently of fluid recirculating through fluidic layers 336. At times, fluid may circulate through both fluidic layers 336 and backside channel 338 (as well as through other portions of fluid channels).

Figure 3E:
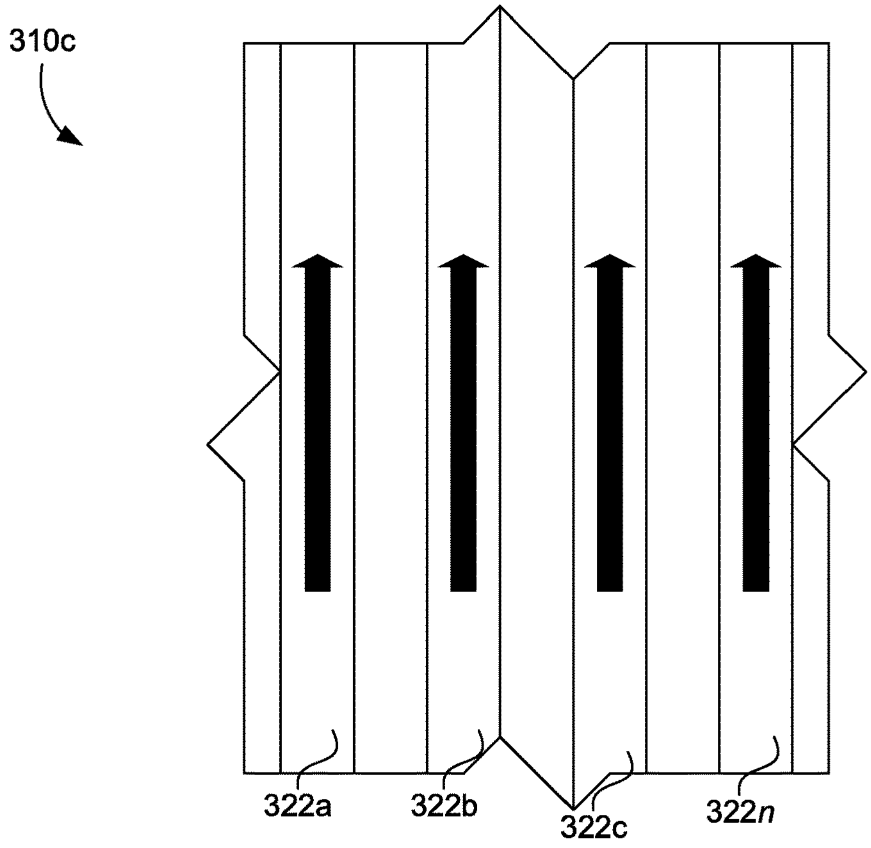
Figure 3F:
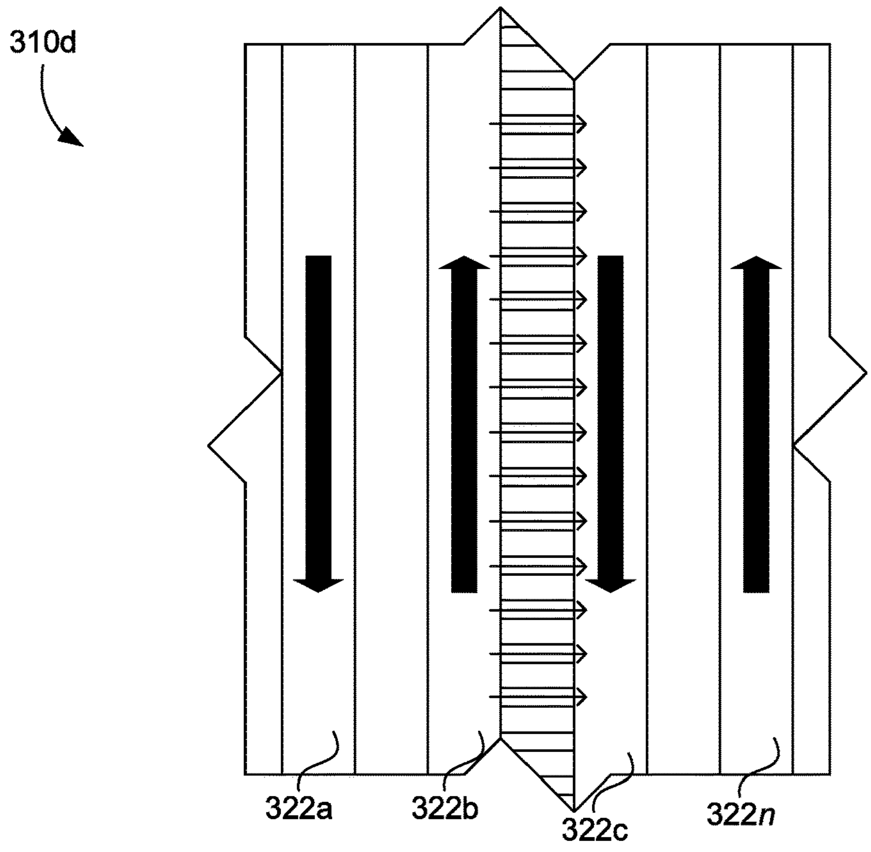

FIGS. 3E and 3F illustrate example fluidic dies 310*c* and 310*d*, respectively, as seen from a perspective to enable detection of direction of propagation of fluid. For instance, fluidic die 310*c* shows fluid flowing through fluid slots 322*a*, 322*b*, 322*c*, and 322*n* as flowing in a same direction. While fluidic die 310*d* shows fluid flowing through fluid slots 322*a*, 322*b*, 322*c*, and 322*n* in an alternating pattern. There may be a benefit in having alternating fluid passages propagate fluid in opposite directions, such as for thermal energy dissipation.

Fluidic die 310*d* has fluid paths that traverse from fluid slot 322*b* towards fluid slot 322*c*, such as due to a pressure differential across the respective slots. In one implementation of such fluid paths, these fluid paths may correspond to backside channels, such as backside channel 338, described above, and may permit fluid to flow from fluid slot 322*b* to fluid slot 322*c* without traversing ejection chambers of the fluidic die. In such examples, a pressure on fluid slot 322*b* may be greater than a pressure on fluid slot 322*c*, such as to cause fluid to flow across the backside channels to fluid slot 322*c*. It should be appreciated that other combinations of fluid flow direction are contemplated by claimed subject matter based on different fluid device implementational details. Indeed, these examples make sense in the context of arrays of ejection chambers, but in the context of other arrangements, different fluid flow paths may be used.

With the foregoing in mind, one example fluid ejection device (e.g., fluid ejection device 200 of FIG. 2) has a fluid recirculating subset of the plurality of distinct fluid channels (e.g., fluid slots 322*b* and 322*c* forming part of a fluid recirculating channel, such as fluid recirculating channel 204 in FIG. 2) and the remaining fluid channels are arranged in an alternating pattern (see, e.g., fluid slots 322*a* and 322*n*, which form part of non-recirculating channels, such a non-recirculating channels 206*a* and 206*n* in FIG. 2).

In the case of another example fluid ejection device (e.g., fluid ejection device 200 of FIG. 2) a fluidic die (e.g., fluidic die 310*b* in FIG. 3D or fluidic die 310*d* in FIG. 3F) comprises a plurality of fluid passage trunks (e.g., fluid slots 322*a*, 322*b*, 322*c*, and 322*n* ) in fluid communication with a plurality of ejection chambers (e.g., ejection chambers 324*a*, 324*b*, 324*c*, and 324*n* ). Each of the plurality of fluid passage trunks correspond to a distinct fluid channel of the plurality of distinct fluid channels (e.g., fluid channels 202*a*, 202*b* and 202*n* in FIG. 2). Each fluid passage trunk of the plurality of fluid passage trunks is to direct flow of printing fluid in a direction opposite of that of adjacent fluid passage trunks (e.g., as shown in FIG. 3F).

Figure 4:
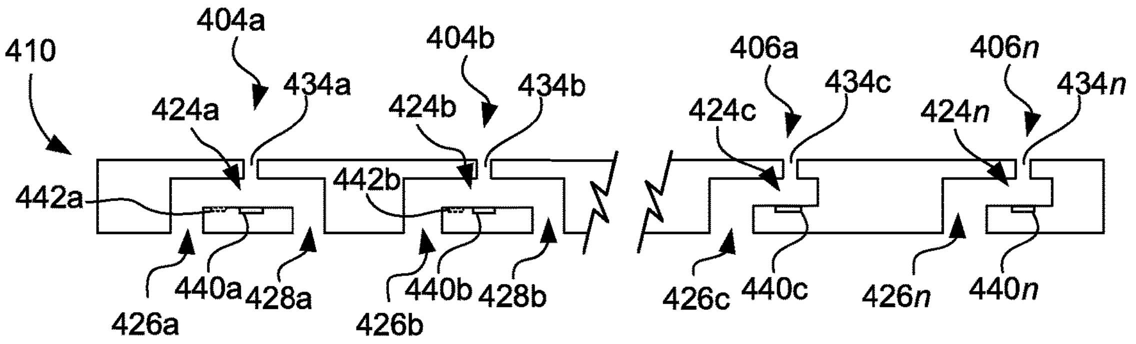
FIG. 4 is a cross-sectional view of an example fluidic die illustrating a combination of microrecirculating type fluid channels and non-microrecirculating type fluid channels.

Additional detail as to ejection chambers of a fluid ejection device comprising a combination of recirculating and non-recirculating fluid channels is now provided with reference to FIG. 4. FIG. 4 illustrates a cross-sectional view of a fluidic die 410 comprising ejection chambers (e.g., ejection chambers 424*a*, 424*b*, 424*c*, and 424*n*) of two types: recirculating and non-recirculating ejection chambers. Similar to fluidic dies discussed in FIGS. 2 and 3A-F, fluidic die 410 comprises orifices 434*a*, 434*b*, 434*c*, and 434*n*. Each of orifices 434*a*, 434*b*, 434*c*, and 434*n* is associated with a different fluid channel, illustrated by fluid recirculating channel 404*a* associated with orifice 434*a*, fluid recirculating channel 404*b* associated with orifice 434*b*, non-recirculating channel 406*a* associated with orifice 434*c*, and non-recirculating channel 406*n* associated with orifice 434*n*. It is noted that it is assumed to simplify discussion that non-recirculating fluid channels 406*a* and 406*n* are of a non-recirculating type. However, consistent with the discussion, above, ejection chambers 424*c* and 424*n* (which are non-macrorecirculating type ejection chambers) may be part of a macrorecirculating type recirculating fluid channel in other examples.

Each of ejection chambers 424*a*, 424*b*, 424*c*, and 424*n* includes a chamber inlet 426*a*, 426*b*, 426*c*, and 426*n*, respectively. Recirculating-type ejection chambers 424*a* and 424*b* also have chamber outlets 428*a* and 428*b*, such as to direct unejected fluid back to a fluid trunk. In some examples, recirculation elements (e.g., recirculating elements 442*a* and 442*b*) may be arranged in proximity to an actuator, such as in chamber inlets (e.g., chamber inlets 426*a* and 426*b*) and/or chamber outlets (e.g., chamber outlets 428*a* and 428*b*) in order to facilitate recirculation of fluids through the ejection chambers. Recirculation elements 442*a* and 442*b* may comprise micropumps, such as in the form of thermal resistors, piezo elements, or other such components to cause fluid flow. In yet other cases, recirculation through ejection chambers 424*a* and 424*b* may be achieved without recirculation elements 442*a* and 442*b*.

In the case of a fluidic die using thermal resistor-based micropumps as recirculation elements 442*a* and/or 442*b*, activation of the micropumps may cause a vaporization of a layer of printing fluid in proximity to the micropump. This may, in turn, cause the printing fluid to flow through a recirculation path. In any case, through some form of fluid flow based on recirculating or non-recirculating fluid channels, fluid may be caused to flow into a combination of ejection chambers 424*a*, 424*b*, 424*c*, and 424*n*. Actuators 440*a*, 440*b*, 440*c*, and/or 440*n* may be energized and cause droplets of fluid to be ejected from orifices 434*a*, 434*b*, 434*c*, and/or 434*n*. In the case of non-recirculating fluid channels 406*a* and 406*n*, capillary fluidic forces may pull fluid back into ejection chambers 424*c* and 424*n* to replace the ejected droplets. In the case of the recirculating fluid channels 404*a* and 404*b*, a combination of capillary fluidic force and the fluidic forces exerted by recirculation components (e.g., pressure inducing components, such as pumps, vacuums, pressure regulators, valves, and the like) may cause fluid to fill the space evacuated by the ejected droplets.

With the foregoing in mind, in one example, a fluid ejection device (e.g., fluid ejection device 200 in FIG. 2) may further include a fluid circulation element (e.g., fluid circulation element 442*a* and/or 442*b*) arranged in fluid inlet slots (e.g., chamber inlet 426*a* and/or chamber inlet 426*b*), fluid outlet slots (e.g., chamber outlet 428*a* and/or chamber outlet 428*b*), or a combination thereof.

Figure 5D:
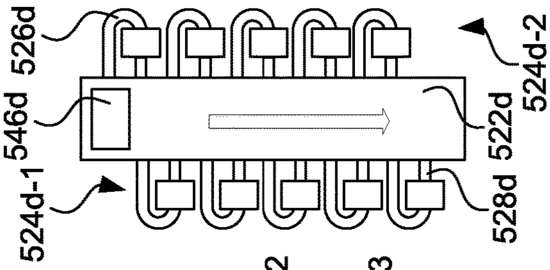
FIGS. 5A-5E are schematic diagrams of different recirculating types and of an example fluidic die illustrating a combination of different circulation types.
Figure 5C:
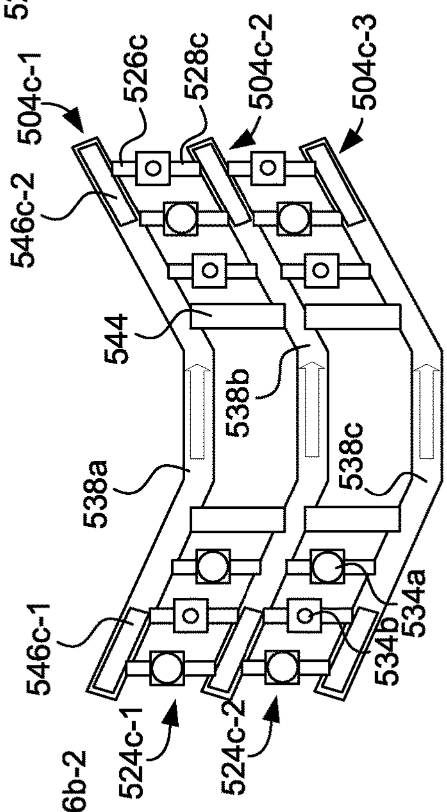
Figure 5B:
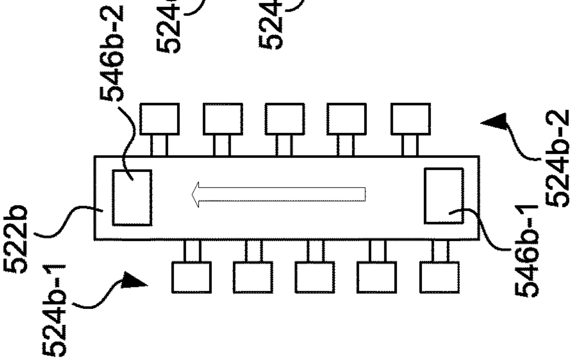

FIG. 4 illustrates a fluidic die with a combination of non-recirculating fluid channels and recirculating fluid channels, and for which the recirculating channels are in the form of microrecirculation. FIG. 5E also shows a portion of an example fluidic die 510 with a combination fluid channels of different types. The 5A dashed box refers to FIG. 5A (fluidics of a non-recirculating type, such as including a non-recirculating channel 506), the 5B dashed box refers to FIG. 5B (fluidics of a macrorecirculating type but without microrecirculation, such as including a fluid recirculating channel 504*a*), the 5C dashed box refers to FIG. 5C (fluidics of both macro- and microrecirculating types, such as including a fluid recirculating channel 504*b*), and the 5D dashed box refers to FIG. 5D (fluidics of a microrecirculating type but without macrorecirculation, such as include a fluid recirculating channel 504*c*). The dashed line for the boxes 5A-5D is to indicate that the different forms of fluid channels may be arranged in fluidic die 510 in different combinations. For instance, in one example, fluidic die 510 may include different combinations of 5A, 5B, 5C, and/or 5D. One example fluidic die 510 may include, for instance, one or more 5A and one or more 5B. In another example, fluidic die 510 may include one or more 5B and one or more 5D. In yet another example, fluidic die 510 may include one or more 5B and one and more 5C. Etc.

Figure 5A:
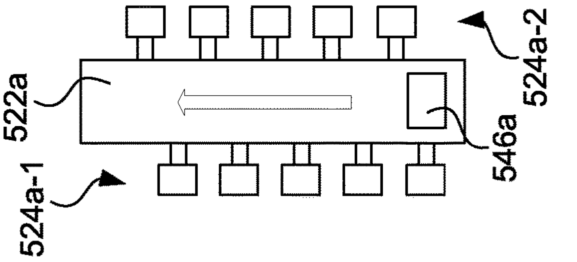
Figure 5E:
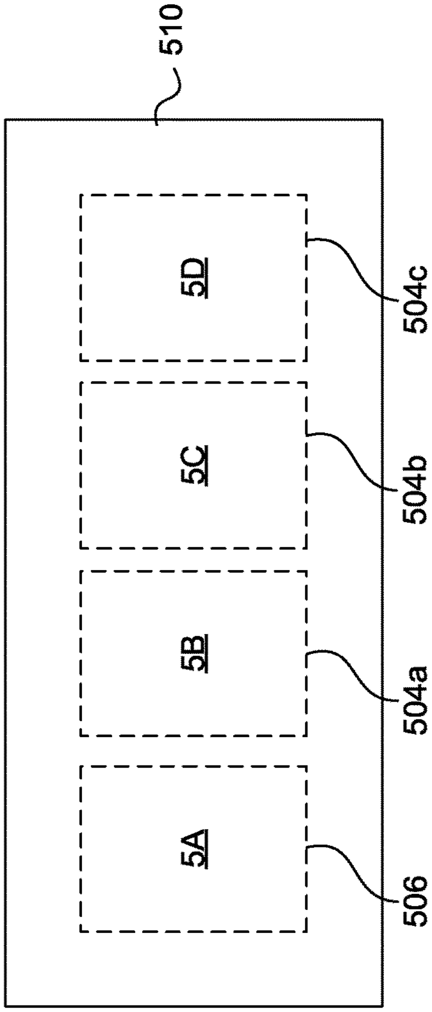

FIG. 5A illustrates an example that includes fluid circulation of a non-recirculating type. In this example, two arrays of ejection chambers 524*a*-1 and 524*a*-2 are illustrated as branching off an example fluid slot 522*a*. The ejection chambers and fluid slots are similar to those discussed previously. For instance, arrays of ejection chambers 524*a*-1 and 524*a*-2 are similar to ejection chamber 424*c* and 424*n* of FIG. 4. Additionally, a feed hole 546*a* is illustrated as providing fluid access to fluid slot 522*a*. In this example, fluid will enter fluid slot 522*a* via feed hole 546*a* and be pulled into different ejection chambers of arrays of ejection chambers 524*a*-1 and 524*a*-2, such as in response to fluidic forces.

FIG. 5B illustrates an example that, like that of FIG. 5A, does not include microrecirculation. But FIG. 5B does include macrorecirculation. In this example, fluid enters fluid slot 522*b* via a feed hole 546*b*-1, circulates along fluid slot 522*b*, and then exits feed slot via feed hole 546*b*-2. Similar to FIG. 5A, fluid is pulled into ejection chambers of arrays of ejection chambers 524*b*-1 and 546*b*-2, such as in response to fluidic forces. Also similar to the example of FIG. 5A, unejected fluid within ejection chambers remains within the chambers. Fluid slot 522*b* may be in the form of a backside channel that runs behind a fluidic die, such as fluidic die 510 of FIG. 5E.

FIG. 5C illustrates aspects of fluid channels of both micro- and macrorecirculating types. Indeed, a first fluid channel of a recirculating type is recirculating channel 504*c*-1 and has an array of ejection chambers 524*c*-1 that is of a microrecirculating type. The ejection chambers are similar in structure to ejection chambers 424*a* and 424*b* in FIG. 4 in that they have a chamber inlet (e.g., chamber inlet 526*c*) and a chamber outlet (e.g., chamber outlet 528*c*). The ejection chambers of recirculating channels 504*c*-2 and 504*c*-3 are similar to those of recirculating channel 504*c*-1. In this example, a number of backside channels 538*a*-538*c* are illustrated running behind the fluidic die (e.g., fluidic die 510 of FIG. 5E). In this implementation, each ejection chamber of fluid recirculating channels 504*c*-1 -504*c*-3 is arranged to span backside channels 538*a*, 538*b*, and 538*c*. A backside channel feed hole (e.g., backside channel feed hole 546*c*-1) is arranged to feed fluid into each respective backside channel (e.g., backside channel 538*a*). It is noted that for simplicity, only two example feed holes are labeled. Another backside channel feed hole (e.g., backside channel feed hole 546*c*-2) is arranged to allow fluid to exit each respective backside channel (e.g., backside channel 538*a*). In one example, a pressure differential across backside channels may cause fluid to propagate in the directions indicated by the arrows over the backside channels. Additionally, pressure differentials may cause fluid to propagate through ejection chambers and bypasses from one backside channel to another. The pressure may be engendered by a combination of pumps, vacuums, valves, and/or pressure regulators, as described above.

In this example, a backside channel feed hole (e.g., backside channel feed hole 546*c*-1) may feed fluid into a backside channel (e.g., backside channel 538*a*), fluid may traverse to a counterpart backside channel (e.g., backside channel 538*b*) through ejection chambers (e.g., entering ejection chambers via a chamber inlet, such as chamber inlet 526*c* and leaving ejection chambers via a chamber outlet, such as chamber outlet 528*c*) and bypass channels (e.g., bypass channel 544). The fluid may leave respective backside channels (e.g., backside channel 538*a*) via a backside channel feed hole (e.g., backside channel feed hole 546*c*-2). The propagation of fluid may be in response to pressure differentials. For instance, backside channel 538*a* may have a first pressure level, which is higher than a pressure level corresponding to the counterpart backside channel 538*b*. As discussed above, pressurization across fluid paths, such as backside channels, may be driven using a combination of pumps, vacuums, valves, and/or pressure regulators, such as discussed above in relation to FIG. 2.

Bypass channel 544 includes a number of fluid passages that may be used to allow fluid to travel through fluid layers of a fluidic die (e.g., fluidic die 510) without necessarily passing through ejection chambers. Bypass channels may be of interest, such as to provide a fluid flow path that can potentially offset pressure loss due to drag encountered by fluid flowing through ejection chambers.

In the example of FIG. 5C, a dual drop weight (DDW) implementation is shown. In this example, orifices of different sizes are shown. DDW fluidic dies and ejection devices refer to devices capable of ejecting printing fluid having two drop weight sizes: a high drop weight (HDW) and a low drop weight (LDW). In the context of a thermal fluid ejection device, using actuators and orifices of differing sizes enables the ejection of fluid droplets having different sizes. For instance, in this implementation, a first orifice 534*a* corresponds to an HDW orifice, while a second orifice 534*b* corresponds to an LDW orifice. LDW and HDW orifices may be arranged in an alternating pattern in which neighboring orifices in an array of orifices are of a different type. Of course, other implementations are contemplated by claimed subject matter.

FIG. 5D illustrates yet another implementation of a fluid channel of a recirculating type. This case shows microrecirculation without macrorecirculation. In this example, fluid enters fluid slot 522*d* via feed hole 546*d*. Similar to the example of FIG. 5A, once in fluid slot 522*d*, fluid may be extracted via ejection chambers, such as arrays of ejection chambers 524*d*-1 and 524*d*-2. However, unlike the example of FIG. 5A, fluid may be recirculated through arrays of ejection chambers 524*d*-1 and 524*d*-2. For instance, fluid may enter an ejection chamber via a chamber inlet (e.g., chamber inlet 526*d*). Fluid may be pulled into an ejection chamber, such as due to fluidic forces. Unejected fluid may exit the ejection chamber via a chamber outlet (e.g., chamber outlet 528*d*).

As noted, above, different combinations of fluid circulation types may be combined in a fluidic die, such as fluidic die 510 in FIG. 5E. For one example fluid ejection device (e.g., fluid ejection device 200 of FIG. 2), a fluidic die (e.g., fluidic die 510) has a plurality of ejection chambers (e.g., arrays of ejection chambers 524*a*-1, 524*a*-2, 524*b*-1, 524*b*-2, 524*c*-1, 524*c*-2, 524*d*-1, 524*d*-2, etc.). A subset of the plurality of ejection chambers corresponds to the fluid recirculating fluid channels, such as of a first type, (e.g., fluid recirculating channel 504*b* in FIG. 5E) corresponding to a microrecirculating and macrorecirculating type recirculating channel. The fluidic die further comprises an ejection chamber bypass channel (e.g., bypass channel 544) fluidically connected to the fluid recirculating subset of the plurality of ejection chambers.

For another example fluid ejection device (e.g., fluid ejection device 200 of FIG. 2), the device has a fluidic die (e.g., fluidic die 510) comprising a plurality of ejection chambers (e.g., ejection chambers 524*c*-1, 524*c*-2, etc.) having an ejection orifice (e.g., orifices 534*a* and 534*b*), the ejection orifice for a subset of the plurality of ejection chambers comprising a low drop weight (LDW) ejection orifice (e.g., orifice 534*b*). The first fluid channel corresponds to the subset of ejection chambers comprising the LDW ejection orifice and the first circulation type comprises microrecirculation, macrorecirculation, or a combination thereof.

Figure 6:
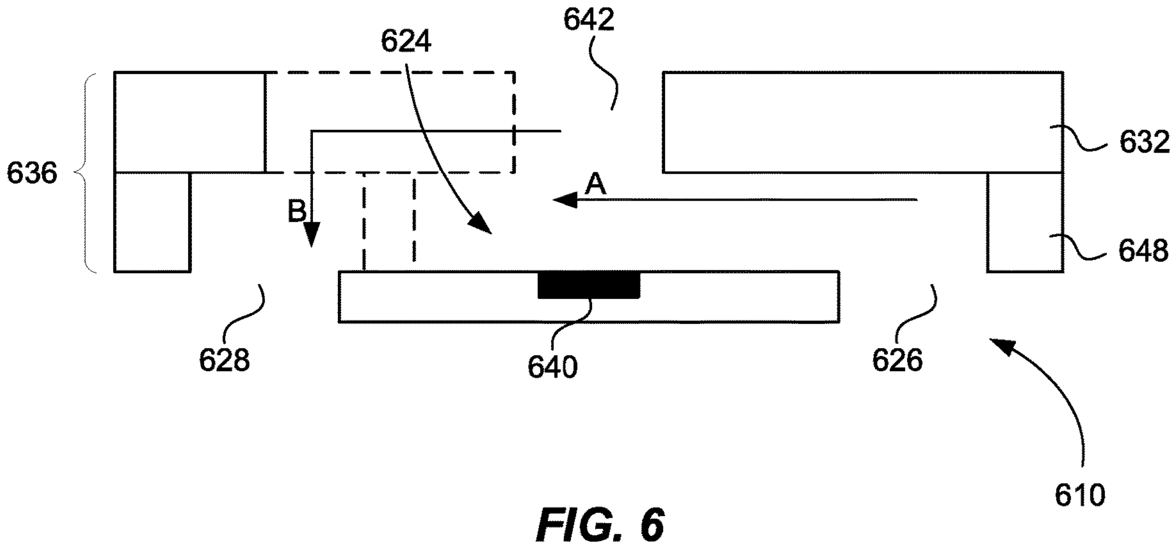
FIG. 6 is a cross-section view of an example fluidic die illustrating microrecirculation in a layer above an ejection chamber.

As noted above, the flow of fluid through an ejection chamber may lead to pressure issues. At times, a pressure exerted on a fluid channel may be raised in order to achieve sufficient flux through the ejection chambers. In some cases, it may be possible to cause fluid to flow through different layers of the fluid layers (e.g., fluid layers 336 in FIG. 3B and 3D) than the ejection chamber. For instance, fluid may be caused to flow above or below the ejection chamber layer of a fluidic die. Such an approach may enable lower pressurization levels to nevertheless achieve desirable recirculation results. FIG. 6 shows a view of an example ejection chamber 624 of an example fluidic die 610 comprising fluid paths through different levels (e.g., above or below) of the fluidic layers 636. Indeed, a chamber layer 648 is a layer of a material (e.g., comprising a photosensitive polymer, such as SU-8) into which chambers may be formed, as shown by ejection chamber 624. An additional material layer, orifice layer 632, such as of a same material of chamber layer 648, may be formed above chamber layer 648. Orifices, such as orifice 642, may be formed in orifice layer 632. Fluid may circulate through different levels of fluidic die 610.

For instance, fluid may enter ejection chamber 624 from a chamber inlet 626 and may traverse the chamber, such as in front of actuator 640, as shown by arrow A. Arrow B shows fluid flowing from ejection chamber 624 and exits via chamber outlet 628. As noted, there may be benefits for pushing fluid flow to levels other than directly through the ejection chamber, such as to reduce rates at which crusts form in orifices and ejection chambers, to lower the flow rate through the chambers, etc.

In one example, an example fluid ejection device (e.g., fluid ejection device 200 of FIG. 2) includes a fluidic die (e.g., fluidic die 610) having a plurality of ejection chambers (e.g., ejection chambers 424*a*-424*n* in FIG. 4). A subset of the plurality of ejection chambers correspond to the fluid recirculating fluid channels (e.g., fluid recirculation channels 404*a* and 404*b* in FIG. 4). And the fluidic die further comprises a recirculation channel above or below the subset of the plurality of ejection chambers (see, e.g., FIG. 6 and arrow B showing the flow of fluid above the ejection chamber).

Figure 7A:
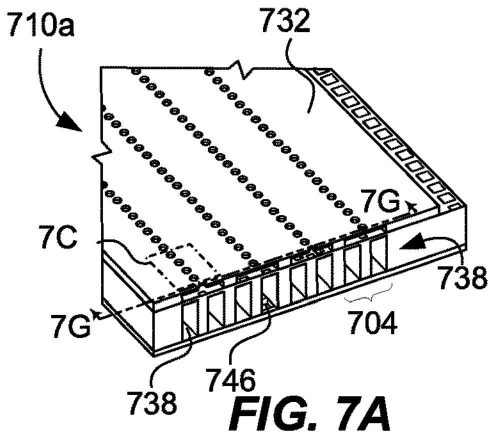
FIGS. 7A-7H illustrate other example fluidic dies from a number of views.
Figure 7B:
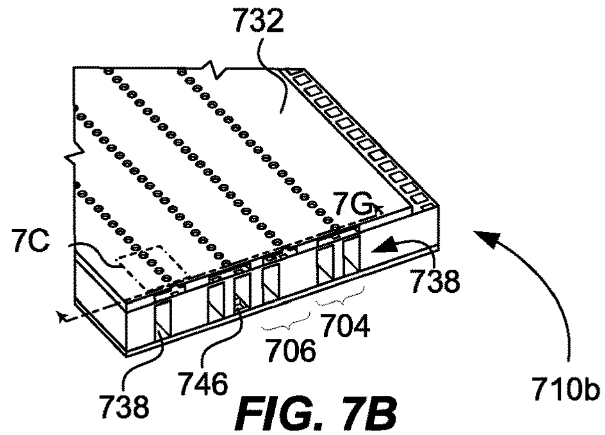

FIGS. 7A-7H illustrate two example fluidic dies 710*a* and 710*b*. FIGS. 7A and 7B include dotted and dashed notations to define views for other figures. Rectangular dashed annotation in FIGS. 7A and 7B labeled 7C and 7D, respectively, indicate the views of FIGS. 7C and 7D, respectively. Likewise, the dashed arrow lines 7G and 7H indicate a view direction for FIGS. 7G and 7H, respectively. Additionally, dashed arrow lines 7E and 7F in FIGS. 7C and 7D, respectively, indicate a view perspective for FIGS. 7E and 7F, respectively.

Fluidic die 710*a* in FIG. 7A represents a die comprising four distinct fluid recirculating channels (of a microrecirculating type), of which fluid recirculating channel 704 is labeled by way of example. By contrast, fluidic die 710*b* in FIG. 7B represents a die comprising a mixture of fluid recirculating channels (e.g., fluid recirculating channel 704) and non-recirculating channels (e.g., non-recirculating channel 706). As noted above, it may be possible that non-recirculating channel 706 be part of a recirculating channel of a macrorecirculating type (e.g., circulating away from fluidic die 710*b*), but for ease of discussion, it will be assumed that non-recirculating channel 706 is truly non-recirculating. Fluid recirculating channels, such as fluid recirculating channel 704, include backside channels, such as backside channel 738. Similar to FIG. 5, in a microrecirculating type fluid recirculating channel, fluid may travel through ejection chambers, such as ejection chamber 724 shown in FIG. 7E, to travel between backside channels.

Figure 7C:
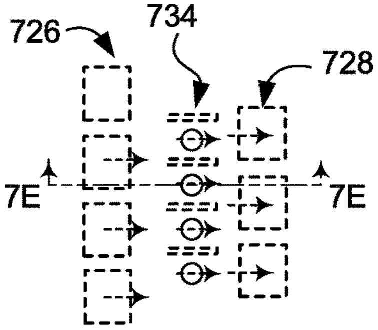

FIG. 7C illustrates a top view of fluidic die 710*a* without orifice layer 732 (of FIG. 7A). In this view, an array of chamber inlets 726 are visible and provide fluid communication between each ejection chamber and fluidically-connected backside channels 738. Likewise, an array of chamber outlets 728 are visible and provide fluid communication between each ejection chamber and fluidically-connected backside channels 738. FIG. 7C uses dotted arrows from chamber inlets 726 across an array of orifices 734 and out via chamber outlets 728. As noted above, fluid not ejected through the array of orifices 734 will flow out of the ejection chamber via chamber outlets 728.

Figure 7D:
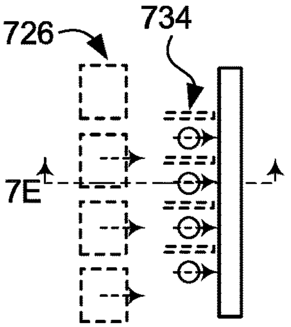
Figure 7E:
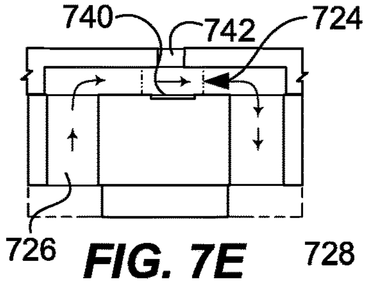
Figure 7F:
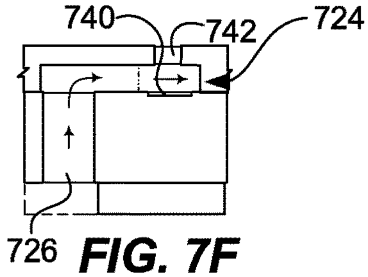

FIG. 7E shows the vertical movement of fluid through chamber inlet 726, through ejection chamber 724, across actuator 740, and down back towards a different backside channel 738 via chamber outlet 728. Fluid may be ejected from ejection chamber 724, via orifice 742 by energizing actuator 740.

Turning to FIG. 7B, an implementation of a fluidic die 710*b* including recirculating channels (of a microrecirculating type) for a subset of fluid channels is illustrated. As illustrated, in one example, a first fluid channel (from the left) is a non-recirculating channel; a subsequent fluid channel is a recirculating channel; a subsequent fluid channel is a non-recirculating channel 706; and a final fluid channel (furthest right) is a recirculating channel 704.

FIG. 7D illustrates an array of orifices 734, which correspond to ejection chambers of a non-recirculating type, as illustrated. For instance, it should be apparent by reference to FIGS. 7D and 7F that fluid may be pulled into ejection chamber 724 from a backside channel 738 via chamber inlet 726. Once fluid enters ejection chamber 724, it may be caused to be ejected via orifice 734 by energizing actuator 740. However, unejected fluid is not recirculated in this example, but remains in ejection chamber 724 and is added to by additional fluid pulled into ejection chamber 724 from backside channel 738 via chamber inlet 726 (e.g., such as in response to capillary fluidic forces).

Figure 7G:
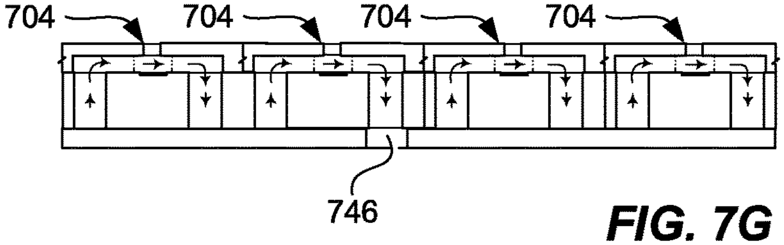

Moving on, FIG. 7G is a cross sectional view of fluidic die 710*a* as indicated by dashed arrow line 7G in FIG. 7A. As should be apparent, in this example, an array of fluid recirculating channels 704 (of a microrecirculating type) are arranged adjacent to each other. In such a case, fluid may be pulled into each ejection chamber and recirculated back out as discussed above with relation to FIG. 7E. It is noted that a single backside channel feed hole 746 is shown. This is due to backside channel feed holes being offset within backside channels 738.

Figure 7H:
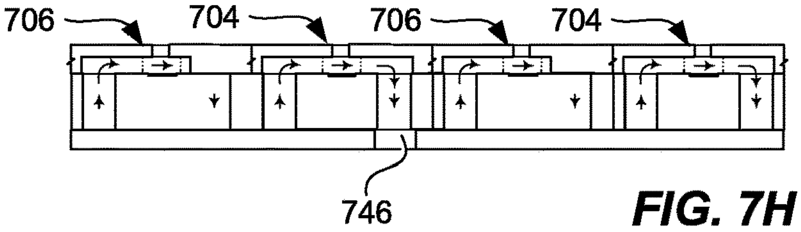

In contrast to FIG. 7G, FIG. 7H is a cross sectional view of fluidic die 710*b* showing an alternating non-recirculating channel 706/recirculating channel 704 arrangement.

In one implementation, an example fluid ejection system (e.g., the fluid ejection system illustrated in FIG. 2) comprises a plurality of fluid reservoirs (e.g., fluid reservoirs 214*a*-214*n*). The system further comprises a fluid ejection device (e.g., fluid ejection device 200) comprising a plurality of fluid inlets (e.g., fluid inlets 208*a*, 208*b*, and 208*n* in FIG. 2) in fluid communication with the plurality of fluid reservoirs. The fluid ejection device also includes a fluidic die (e.g., fluidic die 710*b*), a fluid channel of a first circulation type (e.g., fluid recirculating channel 704 in FIG. 7B), and a fluid channel of a second circulation type (e.g., non-recirculating channel 706 in FIG. 7B). The fluidic die comprises a plurality of fluid ejection chambers (e.g., fluid ejection chambers 724 illustrated in FIGS. 7E, 7F, and 7H). A first set of fluid ejection chambers is in fluid communication with a first fluid inlet of the plurality of fluid inlets and a first fluid reservoir of the plurality of fluid reservoirs. A second set of fluid ejection chambers is in fluid communication with a second fluid inlet of the plurality of fluid inlets and a second fluid reservoir of the plurality of fluid reservoirs. The fluid channel of the first circulation type corresponds to the first fluid inlet and the first set of fluid ejection chambers. And the fluid channel of the second circulation type corresponds to the second fluid inlet and the second set of fluid ejection chambers.

As described above, there may be an interest in a fluid ejection device with a fluid channel of a first recirculation type (e.g., recirculating types such as microrecirculation and/or macrorecirculation, and non-recirculating types) and a fluid channel of a second recirculation type, such as to provide support for fluids with high solid concentrations and/or volatile fluid components without the additional expense and/or complexity of a fluid ejection device comprising but one recirculating type.

What is claimed is:

1. A fluid ejection device comprising:

a plurality of distinct fluid channels, each fluid channel comprising a distinct fluid inlet to the fluid ejection device;

a subset of the plurality of distinct fluid channels comprising fluid recirculating channels, the remaining fluid channels comprising non-recirculating fluid channels; and a fluidic die comprising:

a plurality of ejection chambers, wherein a subset of the plurality of ejection chambers corresponds to the fluid recirculating channels, and a recirculation channel above an ejection chamber of the subset of the plurality of ejection chambers.

2. The fluid ejection device of claim 1, wherein the fluid recirculating channels are of a macrorecirculation type, of a microrecirculation type, or at a combination thereof.

3. The fluid ejection device of claim 1, further comprising:

chamber inlets leading to the subset of the plurality of ejection chambers; and chamber outlets leading away from the subset of the plurality of ejection chambers.

4. The fluid ejection device of claim 3 further comprising a fluid circulation element arranged in the fluid inlets, the fluid outlets, or a combination thereof.

5. The fluid ejection device of claim 1, wherein the fluidic die further comprises an ejection chamber bypass channel fluidically connected to the subset of the plurality of ejection chambers.

6. The fluid ejection device of claim 1, wherein the subset of the plurality of distinct fluid channels and the remaining fluid channels are arranged in an alternating pattern.

7. A fluid ejection device comprising:

a fluidic die;

a plurality of fluid inlets;

a plurality of distinct fluid channels, each fluid channel to provide fluid communication between the plurality of fluid inlets and the fluidic die;

wherein a first fluid channel of the plurality of distinct fluid channels to receive a first printing fluid and a second fluid channel of the plurality of distinct fluid channels to receive a second printing fluid, the first fluid channel comprising a fluid channel of a first circulation type and the second fluid channel comprising a fluid channel of a second circulation type, wherein the fluidic die comprises a plurality of fluid passage trunks in fluid communication with a plurality of ejection chambers, each of the plurality of fluid passage trunks corresponding to a distinct fluid channel of the plurality of distinct fluid channels, and wherein each fluid passage trunk of the plurality of fluid passage trunks is to direct flow of printing fluid in a direction opposite of that of adjacent fluid passage trunks.

8. The fluid ejection device of claim 7, wherein the first printing fluid comprises black and the first circulation type comprises macrorecirculation, and the second printing fluid comprises one of cyan, magenta, or yellow and the second circulation type comprises non-recirculation.

9. The fluid ejection device of claim 7, wherein the first printing fluid comprises a first solid level above a threshold and the first circulation type comprises microrecirculation, macrorecirculation, or a combination thereof.

10. The fluid ejection device of claim 7, wherein the first printing fluid comprises a clear printing fluid and the first circulation type comprises microrecirculation, macrorecirculation, or a combination thereof, and the second printing fluid comprises one of black, cyan, magenta, or yellow, and the second circulation type comprises macrorecirculation or non-recirculation.

11. The fluid ejection device of claim 7, wherein the fluidic die comprises a plurality of ejection chambers having an ejection orifice, the ejection orifice for a subset of the plurality of ejection chambers comprising a low drop weight (LDW) ejection orifice; and wherein the first fluid channel corresponds to the subset of ejection chambers comprising the LDW ejection orifice and the first circulation type comprises microrecirculation, macrorecirculation, or a combination thereof.

12. A fluid ejection system comprising:

a plurality of fluid reservoirs;

a fluid ejection device comprising a plurality of fluid inlets in fluid communication with the plurality of fluid reservoirs, the fluid ejection device further comprising:

a fluidic die comprising a plurality of fluid ejection chambers, a first set of fluid ejection chambers in fluid communication with a first fluid inlet of the plurality of fluid inlets and a first fluid reservoir of the plurality of fluid reservoirs, a second set of fluid ejection chambers in fluid communication with a second fluid inlet of the plurality of fluid inlets and a second fluid reservoir of the plurality of fluid reservoirs;

a fluid channel of a first circulation type corresponding to the first fluid inlet and the first set of fluid ejection chambers;

a fluid channel of a second circulation type corresponding to the second fluid inlet and the second set of fluid ejection chambers; and a fluid interposer layer in contact with the fluidic die, the fluid interposer layer comprising fluid paths in fluid communication with the plurality of fluid inlets, wherein a subset of the fluid paths are connected to fluid return passages to direct print fluid away from the first set of fluid ejection chambers and to a first fluid outlet.

* * * * *